United States Patent
Vasickova et al.

(10) Patent No.: US 9,512,552 B2
(45) Date of Patent: Dec. 6, 2016

(54) AUTOMATIC WEIGHING METHOD OF LAUNDRY IN WASHING MACHINE

(71) Applicant: ALLIANCE LAUNDRY CE s.r.o., Pribor (CZ)

(72) Inventors: Zuzana Vasickova, Ostrava (CZ); Pavel Stepan, Palkovice (CZ); Milan Janicek, Odry (CZ)

(73) Assignee: ALLIANCE LAUNDRY CE s.r.o., Pribor (CZ)

( * ) Notice: Subject to any disclaimer, the term of this patent is extended or adjusted under 35 U.S.C. 154(b) by 62 days.

(21) Appl. No.: 14/486,320

(22) Filed: Sep. 15, 2014

(65) Prior Publication Data

US 2016/0076188 A1    Mar. 17, 2016

(51) Int. Cl.
| | |
|---|---|
| *D06F 39/00* | (2006.01) |
| *D06F 37/20* | (2006.01) |
| *D06F 37/36* | (2006.01) |
| *G01G 19/52* | (2006.01) |
| *G01G 9/00* | (2006.01) |

(52) U.S. Cl.
CPC ........... *D06F 39/003* (2013.01); *D06F 37/203* (2013.01); *G01G 19/52* (2013.01); *G01G 9/00* (2013.01)

(58) Field of Classification Search
CPC ........ D06F 37/203; D06F 39/003; G01G 9/00; G01G 19/52
See application file for complete search history.

(56) References Cited

U.S. PATENT DOCUMENTS

| | | | | |
|---|---|---|---|---|
| 5,642,105 A | * | 6/1997 | Duffy | B21B 31/07 340/682 |
| 5,677,606 A | * | 10/1997 | Otake | H02H 7/09 318/434 |

(Continued)

FOREIGN PATENT DOCUMENTS

| | | |
|---|---|---|
| EP | 2264239 | 11/1941 |
| EP | 2009 169 A2 | 12/2008 |
| WO | WO 2004/081276 A1 | 9/2004 |

*Primary Examiner* — Randy W Gibson
(74) *Attorney, Agent, or Firm* — Horst M. Kasper

(57) ABSTRACT

Automatic weighing method for washing machine, where determination of temperature of an engine by frequency modulator is processed, during that measuring of amount of current passing through the winding of the engine of the washing machine during its inaction is done, and afterwards calculation of resistance of the winding of the engine of the washing machine based on amount of measured current is effected, afterwards angular speed of the drum of the washing machine is increased up to distribution angular speed ($\omega_0$), which is intended to distribute laundry in the drum of the washing machine, afterwards angular speed of the drum of the washing machine is increased up to medium angular speed ($\omega_1$), which is intended to spread the laundry on the inner surface of the drum of the washing machine, afterwards angular speed of the drum of the washing machine is decreased up to measuring angular speed ($\omega_2$), during that a value of unbalance of the drum of the washing machine is determined, afterwards angular speed of the drum of the washing machine is increased up to maximal angular speed ($\omega_3$), during that energy consumed for acceleration of the drum of the washing machine is measured.

4 Claims, 1 Drawing Sheet

(56) References Cited

U.S. PATENT DOCUMENTS

| | | | |
|---|---|---|---|
| 7,162,759 B2* | 1/2007 | Weinmann | D06F 3/02 68/12.04 |
| 7,296,445 B2* | 11/2007 | Zhang | D06F 7/22 68/12.06 |
| 8,420,957 B2* | 4/2013 | Berti | D06F 5/007 177/1 |
| 8,489,358 B2* | 7/2013 | Petronilho | D06F 9/003 68/12.02 |
| 8,674,242 B2* | 3/2014 | Kim | D06F 7/12 177/1 |
| 2004/0154350 A1* | 8/2004 | Weinmann | D06F 3/02 68/12.04 |
| 2005/0015890 A1* | 1/2005 | Kim | D06F 3/02 8/158 |
| 2006/0021392 A1* | 2/2006 | Hosoito | D06F 3/02 68/12.04 |
| 2008/0041115 A1* | 2/2008 | Kanazawa | D06F 3/02 68/12.04 |
| 2009/0112513 A1* | 4/2009 | Filippa | G01G 19/56 702/175 |
| 2010/0320007 A1 | 12/2010 | Berti | |
| 2011/0202303 A1* | 8/2011 | Petronilho | D06F 9/003 702/141 |

\* cited by examiner

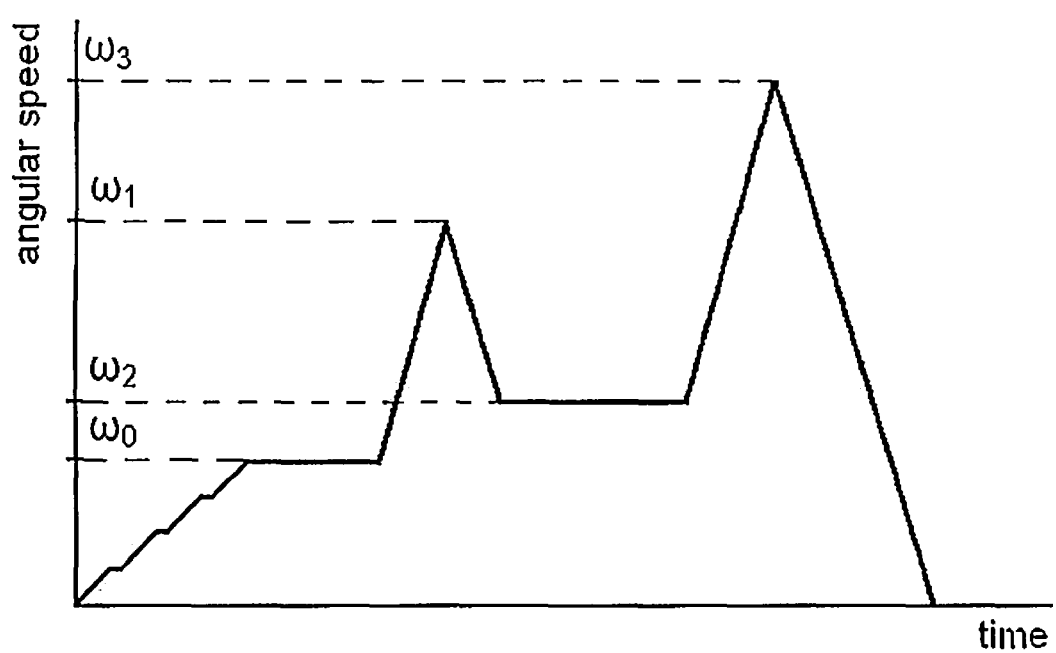

AUTOMATIC WEIGHING METHOD OF LAUNDRY IN WASHING MACHINE

BACKGROUND OF THE INVENTION

The invention concerns the automatic weighing method of laundry in washing machine by specific measurements performed during different angular speeds of its drum.

STATE OF THE ART

During washing process a washing machine consumes specific quantity of water, washing detergent and electric energy. In present time, consumption of those items in a washing machine without a weighing system depends on a maximal charge of the washing machine. So, if the washing machine is only one quarter charged of its maximum, a consumption of water, electric energy and detergent is same as for a fully charged washing machine. For the reason of optimal reduction of consumed water and energy the washing machine needs to have an information about amount of laundry inserted into the drum of the washing machine for the specific washing process. There are many ways to detect weight of laundry inside the drum of the washing machine.

In US 2010/0320007 a method for weighing of washed laundry inside a drum of a washing machine is presented, consisting of following steps:
  laundry distribution in the drum of the washing machine by rotation of mentioned drum by first angular speed,
  rotation of mentioned drum of the washing machine by second angular speed, where the second angular speed is higher than first angular speed, by that the laundry is stable spread on the inner surface of the drum of the washing machine, by that way inertial movement of the laundry with constant moment of inertia is effected,
  measuring of energy absorbed by engine to drive the drum of the washing machine during third angular speed and fourth angular speed, where third angular speed and fourth angular speed is between the first angular speed and the second angular speed.

In EP 2 264 239 A1 a laundry weighing method for a washing machine is presented, consisting of following steps:
  optimization of laundry distribution in the drum of the washing machine,
  limitation of inertia of the laundry with constant moment of inertia,
  measuring of energy absorbed by engine to drive the drum of the washing machine during predetermined positive and negative angular acceleration of the charged drum.

In EP 2 009 169 A2 a washing machine consisting of a sensor intended for measuring of rotation of a drum, and control unit intended for calculation amount of laundry based on determined first acceleration of the drum of the washing machine and on determined second acceleration of the drum of the washing machine is presented. However, measuring of weight of laundry based only on knowledge of acceleration and rotation of the drum of the washing machine is insufficient and inaccurate.

In WO 2004/081276 A1 a system intended for detection of amount of laundry in a drum in an automatic laundry machine is presented, consisting of:
  a voltage sensor intended for detection of voltage on incoming contacts of an engine,
  a rotation sensor intended to detect rotation of the electrical engine,
  a control unit interconnected with a timer, with the voltage sensor and with the rotation sensor, intended to count inertia of charge in the drum of the washing machine by acceleration working time and breaking working time. A signal represents amount, respectively weight, of the laundry in the drum of the washing machine is created by subtraction of the inertia of the drum from inertia of the charge in the drum.

Disadvantage of all those above mentioned systems is, that there is not any calculation with any correction factors, based on temperature of the engine and on the value of inertia of laundry in the drum of the washing machine. In case of industrial washing machines, which are doing more washing cycles one after another, the difference of the temperature of components of the washing machine between those cycles is substantive. Bearings are heated and its resistance is declined. It causes declination of electrical resistance of the engine and reduction of energy required for acceleration of the washing drum. Declination of energy can influence measured weight of laundry by few kilograms. The same is valid also for unbalance possibly generated by laundry. High unbalance means high energy consumption during acceleration of the drum.

In US 2011/0202303 a method for determining loads in clothes washing machines is presented. The present invention refers to a method for determining loads in clothesshing machines which conprises the following steps:
  Acceleration of the mobile assembly of the washing machine until the mobile ass mbly reaches a low rotation speed;
  Acceleration of the mobile assy until the mobile assembly reaches a medium rotation speed faster than the speed in the first step;
  Deceleration, whereby the engine which turns the mobile assembly is shutdown;
  Acceleration of the mobile assembly and measurement of the engine current, whereby the speed of the engine which turns the mobile assembly is increased up to a pre-determination speed limit;
  Measurement during the acceleration, whereby parameters regarding the engine are measured;
  Shutdown of the engine and measurement of the deceleration time, whereby the said engine is turned off and turns via inertia, with the time spent from the shutdown until a pre-determined minimum speed limit is reached, being measured;
  Repetition, whereby the fourth, fifth and sixth steps are repeated at least once before the performance of the eighth step;
  Calculation of the average of each one of the parameters measured in the fourth, fifth, sixth and seventh steps; and ninth step;
  Obtainment of clothes load value based on the values obtained by eight step through the application of a neural network or from an empirical equation.

The aim of the present invention is to disclose an automatic weighing method for a washing machine, which eliminates above mentioned disadvantages of known systems and enables accurate weighing of laundry without substantial increase of price of the system.

FEATURE OF THE INVENTION

Above mentioned disadvantages are considerably eliminated by use of the automatic weighing method for a washing machine, where determination of the temperature of an engine by frequency modulator is processed, where the determination is based on a value of calculated resistance of the winding of the engine of the washing machine, where for the calculation of the resistance of the winding of the engine of the washing machine is used amount of current measured on the winding of the engine of the washing machine measured at the time, when the engine doesn't work, afterwards the angular speed of the drum of the washing machine is increased up to a distribution angular speed, ($\omega_0$), which is intended to distribute laundry in the drum of the washing machine, afterwards the angular speed of the drum of the washing machine is increased up to a medium angular speed, ($\omega_1$) which is intended to spread the laundry on the inner surface of the drum of the washing machine, afterwards the angular speed of the drum of the washing machine is decreased to a measuring angular speed ($\omega_2$), and during maintenance of the angular speed at the measuring angular speed ($\omega_2$) a value of unbalance of the drum of the washing machine is determined, afterwards the angular speed of the drum of the washing machine is increased up to a maximal angular speed ($\omega_2$), during which the current consumed for the acceleration of the drum of the washing machine is measured, afterwards the weight of the laundry in the drum of the washing machine is calculated using the determined temperature of the engine, by the value of the unbalance of the laundry in the drum of the washing machine, and the sum of current consumed during the acceleration of the drum of the washing machine from the measuring angular speed ($\omega_2$) up to the maximal angular speed ($\omega_3$).

In advantageous embodiment the angular speed is increased up to the distribution angular speed ($\omega_0$) by steps.

In another advantageous embodiment the distribution angular speed ($\omega_0$) is from 90 to 150 rpm.

In another advantageous embodiment the medium angular speed ($\omega_1$) is from 300 to 500 rpm.

In another advantageous embodiment the maximal angular speed ($\omega_3$) is from 450 to 550 rpm.

while the maximal angular speed ($\omega_3$) is higher than the medium angular speed ($\omega_1$).

In another advantageous embodiment determination of the value of unbalance depends on a rage of a value of current amplitude of the engine and on an average value of current of the engine during maintenance of the angular speed at the measuring angular speed ($\omega_2$).

DESCRIPTION OF THE DRAWING

The invention will be further explained by use of FIG. 1, which presents a graph of continuance of angular speed of a drum of a washing machine.

PREFERRED EMBODIMENT OF THE INVENTION

An automatic weighing method of laundry in a washing machine according to the invention is based on principle of energy conservation, i.e. energy generated by engine intended to start spinning of the drum of the washing machine charged by laundry is directly proportional to weight of the laundry placed in the drum of the washing machine. So, high weight of the laundry means high effected work. Because the value of effected work is not influenced only by weight of laundry inserted into the drum of the washing machine, this method is not possible to use without calculation of correction factors.

First of those correction factors is unbalance of laundry in the drum. High unbalance of the laundry means that high work have to be effected for beginning of rotation of the drum of the washing machine up to predetermined angular speed for the same weight of the laundry. This relation is possible to determine by measuring and subsequently setting the correction factor. According to that, measuring of unbalance of laundry in the drum of the washing machine is needed to be inserted into the measuring sequence.

Another correction factor is temperature of an engine and of whole mechanical system of the washing machine. High temperature means lower effected work for acceleration of rotation of the drum of the washing machine for the same weight of laundry. This relation is possible to determine by measuring and subsequently setting the correction parameters. Temperature of the system is specified by temperature of the engine, which is determined without any additional sensors by frequency modulator.

Continuance of an automatic weighing method of laundry in the washing machine according to the invention comprises following steps illustrated on FIG. 1, which presents the graph of continuance of angular speed of the drum of the washing machine during weighing of laundry:

determination of temperature of the engine by frequency modulator, i.e. measuring of current passing through the winding of the engine of the washing machine during inaction, and calculation of resistance of the winding of the engine of the washing machine based on amount of measured current, distribution of the laundry in the inner space of the drum of the washing machine by acceleration of the drum up to the distribution angular speed $\omega_0$, which can be from 90 to 150 rpm, based on size of the washing machine, whereas the acceleration of angular speed can be by steps.

spreading of the laundry on the inner wall of the drum of the washing machine by its acceleration up to the medium angular speed $\omega_1$, which can be from 300 to 500 rpm, based on a type of the washing machine.

reduction of angular speed of the washing machine up to the measuring angular speed $\omega_2$. During that value of unbalance generated by laundry in the washing machine is determined. The value of unbalance is determined from ratio between value of amplitude of current of the engine and middle value of current of the engine during the stable measuring angular speed $\omega_2$. The measuring angular speed $\omega_2$ can be same as the distribution angular speed $\omega_0$.

increase of angular speed of the drum of the washing machine up to maximal angular speed $\omega_3$, which can be from 450 to 550 rpm, based on a type of the washing machine. During that acceleration energy consumed by engine for this acceleration is measured. The maximal angular speed $\omega_3$ is high than the medium angular speed $\omega_1$, calculation of weight of the laundry in the drum of the washing machine by the measured parameters, i.e. resistance of the engine, amount of unbalance of the laundry in the drum of the washing machine, sum of electrical energy consumed during acceleration of the drum of the washing machine to the maximal angular speed $\omega_3$, calculated by a following formula (1):

$$m = \frac{I + a \cdot T + b \cdot U_n^2 + c \cdot U_n - K}{d} \quad (1)$$

Where:
I is sum of current during acceleration,
T is temperature of the engine,
$U_n$ is value of unbalance, K is a calibration constant for the washing machine without loading,
a, b, c, d are experimentally defined constants.

Calculation of weight of laundry in the drum of the washing machine is based on principle of direct proportion between energy consumed during acceleration of the drum, and weight of laundry in the drum of the washing machine, and further it is based on previously set dependencies on temperature of engine and on a value of unbalance of the laundry in the drum of the washing machine.

An advantage of the presented technical solution in comparison to prior of the art is determination of weight of laundry without use of any additional sensors arranged in a construction of the washing machine, so production cost of the washing machine is not increased.

As mentioned before, knowledge of weight of laundry in the drum of the washing machine is important for an economically working process of the washing machine. Thanks to this knowledge effective dosing of water into the washing machine is possible, because water level in the drum depends on weight of laundry. Thanks to that, during whole cycles the washing machine can safe more than 50% of value of normally consumed water. Another point of economy is value of electrical energy consumed for water heating. In case that the drum comprises less water, heating time is shorter and thanks to that the consumed electrical energy for the whole washing cycle is also less. Knowledge of weight of laundry in the drum of the washing machine also influences consumption of the detergent in direct proportion.

The invention claimed is:

1. Automatic weighing method for a washing machine comprising a drum and an engine for rotating said drum where
   determination of the temperature of the engine is processed, where the determination is based on value of calculated resistance of the winding of the engine of the washing machine, where for the calculation of the resistance of the winding of the engine of the washing machine is used value of current measured on the winding of the engine of the washing machine measured at the time, when the engine does not work,
   afterwards the angular speed of the drum of the washing machine is increased up to a distribution angular speed ($\omega_0$), which is intended to distribute laundry in the drum of the washing machine,
   afterwards the angular speed of the drum of the washing machine is increased up to a medium angular speed ($\omega_1$), which is intended to spread the laundry on the inner surface of the drum of the washing machine,
   afterwards the angular speed of the drum of the washing machine is decreased to a measuring angular speed ($\omega_2$), and during maintenance of the angular speed at the measuring angular speed ($\omega_2$) a value of unbalance of the drum of the washing machine is determined,
   afterwards the angular speed of the drum of the washing machine is increased up to a maximal angular speed ($\omega_3$), during which the current consumed for the acceleration of the drum of the washing machine is measured,
   afterwards the weight of the laundry in the drum of the washing machine is calculated by using the determined temperature of the engine, by the value of the unbalance of the laundry in the drum of the washing machine, and by the sum of current consumed during the acceleration of the drum of the washing machine from the measuring angular speed ($\omega_2$) up to the maximal angular speed ($\omega_3$),
   the angular speed is increased up to the distribution angular speed ($\omega_0$) by steps,
   the maximal angular speed ($\omega_3$) is higher than the medium angular speed ($\omega_1$),
   determination of the value of unbalance depends on a range of a value of current amplitude of the engine and on an average value of current of the engine during maintenance of the angular speed at the measuring angular speed ($\omega_2$).

2. Automatic weighing method for a washing machine according to the claim 1 characterized in, that the distribution angular speed ($\omega_0$) is from 90 to 150 rpm.

3. Automatic weighing method for a washing machine according to the claim 1 characterized in, that the medium angular speed ($\omega_1$) is from 300 to 500 rpm.

4. Automatic weighing method for a washing machine according to the claim 1 characterized in, that the maximal angular speed ($\omega_3$) is from 450 to 550 rpm.

* * * * *